(12) United States Patent  
Lacaze et al.

(10) Patent No.: US 12,085,940 B2  
(45) Date of Patent: *Sep. 10, 2024

(54) AUTONOMOUS TRUCK LOADING FOR MINING AND CONSTRUCTION APPLICATIONS

(71) Applicant: Robotic Research OpCo, LLC, Clarksburg, MD (US)

(72) Inventors: Alberto Daniel Lacaze, Potomac, MD (US); Karl Nicholas Murphy, Cocoa Beach, FL (US)

(73) Assignee: Robotic Research OpCo, LLC, Clarksburg, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/132,539

(22) Filed: Apr. 10, 2023

(65) Prior Publication Data

US 2023/0251666 A1 Aug. 10, 2023

Related U.S. Application Data

(63) Continuation of application No. 16/676,544, filed on Nov. 7, 2019, now Pat. No. 11,656,626.

(Continued)

(51) Int. Cl.
*G05D 1/00* (2024.01)
*B60W 60/00* (2020.01)
(Continued)

(52) U.S. Cl.
CPC ....... *G05D 1/0212* (2013.01); *B60W 60/0011* (2020.02); *B60W 60/0027* (2020.02);
(Continued)

(58) Field of Classification Search
CPC .. G05D 1/0212; G05D 1/0219; G05D 1/0251; G05D 1/0231; G05D 1/0255;
(Continued)

(56) References Cited

U.S. PATENT DOCUMENTS

| 5,555,503 A | 9/1996 | Kyrtsos et al. |
| 6,044,312 A * | 3/2000 | Sudo ............ E02F 9/2045 |
| | | 701/410 |

(Continued)

FOREIGN PATENT DOCUMENTS

| CN | 106627456 A | 5/2017 |
| JP | H08-263138 A | 10/1996 |
| WO | 2017/180430 A1 | 10/2017 |

OTHER PUBLICATIONS

Notice of Allowance, issued Feb. 2, 2023 (Feb. 2, 2023), in U.S. Appl. No. 16/676,544. (8 pages).

(Continued)

*Primary Examiner* — Dale W Hilgendorf  
(74) *Attorney, Agent, or Firm* — RowanTree Law Group, PLLC; Frederick F. Rosenberger

(57) ABSTRACT

An autonomous truck loading system can have a database that stores a plurality of elementary behaviors for various phases of a process of loading the autonomous truck by the one or more loaders. The stored elementary behaviors can include predetermined maneuvers for the autonomous truck, sensing behaviors; and logic behaviors. An operator can select multiple ones of the stored behaviors via user interface. A controller can assemble the selected behaviors together into an operation script for loading of the autonomous truck by a loader. The controller can control the autonomous truck to perform the operation script.

20 Claims, 5 Drawing Sheets

Related U.S. Application Data

(60) Provisional application No. 62/759,963, filed on Nov. 12, 2018.

(51) Int. Cl.
  *B66F 9/06* (2006.01)
  *B66F 9/075* (2006.01)
  *E02F 9/26* (2006.01)
  *E21F 5/02* (2006.01)

(52) U.S. Cl.
  CPC ............ *B66F 9/063* (2013.01); *B66F 9/0755* (2013.01); *G05D 1/0219* (2013.01); *E02F 9/261* (2013.01); *E21F 5/02* (2013.01); *G05D 1/0231* (2013.01); *G05D 1/0251* (2013.01); *G05D 1/0255* (2013.01); *G05D 1/0257* (2013.01); *G05D 1/0268* (2013.01)

(58) Field of Classification Search
  CPC ............... G05D 1/0257; G05D 1/0268; G05D 2201/0202; B60W 60/0011; B60W 60/0027; B66F 9/063; B66F 9/0755; E02F 9/261
  See application file for complete search history.

(56) References Cited

U.S. PATENT DOCUMENTS

| | | | |
|---|---|---|---|
| 6,341,372 B1 | 1/2002 | Datig | |
| 9,383,754 B2* | 7/2016 | Takeda | G06Q 50/02 |
| 9,925,662 B1 | 3/2018 | Jules et al. | |
| 10,048,692 B2* | 8/2018 | Hamada | G05D 1/0044 |
| 10,071,893 B2 | 9/2018 | High et al. | |
| 10,108,196 B2* | 10/2018 | Kadono | G05D 1/0285 |
| 10,394,250 B2* | 8/2019 | Kadono | B60P 1/04 |
| 10,662,613 B2* | 5/2020 | Ready-Campbell | G05D 1/0088 |
| 10,802,503 B2* | 10/2020 | Minagawa | G05D 1/0044 |
| 11,353,865 B2* | 6/2022 | Lacaze | G06F 8/443 |
| 11,656,626 B2* | 5/2023 | Lacaze | B66F 9/0755 701/23 |
| 2004/0158355 A1* | 8/2004 | Holmqvist | E02F 9/262 701/23 |
| 2008/0021632 A1 | 1/2008 | Amano | |
| 2008/0243381 A1 | 10/2008 | Villalobos et al. | |
| 2009/0076674 A1* | 3/2009 | Kiegerl | E02F 9/264 701/2 |
| 2011/0029238 A1 | 2/2011 | Lee et al. | |
| 2012/0092486 A1* | 4/2012 | McDaniel | G05D 1/024 348/118 |
| 2012/0136509 A1* | 5/2012 | Everett | E02F 9/2054 701/2 |
| 2012/0136524 A1 | 5/2012 | Everett et al. | |
| 2013/0173109 A1* | 7/2013 | Hukkeri | E02F 9/264 701/23 |
| 2013/0261870 A1 | 10/2013 | Halder et al. | |
| 2013/0325208 A1* | 12/2013 | Osagawa | E02F 9/205 701/25 |
| 2014/0110989 A1 | 4/2014 | McKinley | |
| 2014/0309841 A1* | 10/2014 | Hara | G01S 17/89 701/26 |
| 2014/0371947 A1* | 12/2014 | Stratton | G01C 7/04 701/1 |
| 2015/0057871 A1 | 2/2015 | Ono et al. | |
| 2015/0285650 A1* | 10/2015 | Lewis | G01C 21/3667 701/428 |
| 2016/0040397 A1 | 2/2016 | Kontz | |
| 2016/0264032 A1 | 9/2016 | Terada et al. | |
| 2016/0271795 A1 | 9/2016 | Vicenti | |
| 2016/0314224 A1 | 10/2016 | Wei et al. | |
| 2016/0349754 A1 | 12/2016 | Mohr et al. | |
| 2016/0379152 A1 | 12/2016 | Rodoni | |
| 2017/0017235 A1* | 1/2017 | Tanaka | G05D 1/0297 |
| 2017/0247033 A1 | 8/2017 | Vandapel | |
| 2017/0253237 A1 | 9/2017 | Diessner | |
| 2017/0285655 A1* | 10/2017 | Katou | G09B 29/007 |
| 2017/0314955 A1 | 11/2017 | Lynn | |
| 2017/0315515 A1 | 11/2017 | Vandapel et al. | |
| 2018/0004224 A1 | 1/2018 | Arndt et al. | |
| 2018/0016124 A1* | 1/2018 | Keller | G05D 1/024 |
| 2018/0044888 A1* | 2/2018 | Chi | G06F 16/2455 |
| 2018/0088591 A1* | 3/2018 | Friend | G05D 1/0291 |
| 2018/0267537 A1* | 9/2018 | Kroop | B60W 30/16 |
| 2019/0033877 A1 | 1/2019 | Wei | |
| 2019/0072953 A1 | 3/2019 | Maheshwari et al. | |
| 2019/0073762 A1 | 3/2019 | Kean | |
| 2019/0113919 A1* | 4/2019 | England | B60W 60/0011 |
| 2019/0212745 A1 | 7/2019 | Wendt et al. | |
| 2019/0279508 A1 | 9/2019 | Wang | |
| 2019/0286148 A1 | 9/2019 | Hase et al. | |
| 2019/0302794 A1* | 10/2019 | Kean | B66C 13/40 |
| 2019/0370726 A1 | 12/2019 | Ha et al. | |
| 2020/0033847 A1 | 1/2020 | Way et al. | |
| 2020/0050192 A1 | 2/2020 | O'Donnell et al. | |
| 2020/0117201 A1 | 4/2020 | Oetken et al. | |
| 2020/0150656 A1 | 5/2020 | Lacaze et al. | |
| 2020/0150668 A1 | 5/2020 | Lacaze et al. | |
| 2020/0150687 A1 | 5/2020 | Halder et al. | |
| 2020/0174486 A1 | 6/2020 | Uo et al. | |
| 2020/0180924 A1 | 6/2020 | Acaze et al. | |
| 2020/0225675 A1 | 7/2020 | Lacaze et al. | |
| 2020/0344622 A1 | 10/2020 | Campbell, Jr. et al. | |
| 2020/0362541 A1 | 11/2020 | Takaoka | |
| 2020/0384987 A1 | 12/2020 | Preissler | |
| 2020/0394813 A1 | 12/2020 | Theverapperuma et al. | |
| 2020/0401134 A1 | 12/2020 | Lacaze et al. | |
| 2021/0064050 A1 | 3/2021 | Pickett et al. | |
| 2021/0124359 A1 | 4/2021 | Wei | |
| 2021/0141372 A1 | 5/2021 | Lacaze et al. | |
| 2022/0253062 A1* | 8/2022 | Gan | B60L 15/20 |
| 2022/0356674 A1* | 11/2022 | Norfleet | G05D 1/0217 |

OTHER PUBLICATIONS

Office Action, issued Jul. 30, 2021 (Jul. 30, 2021), in U.S. Appl. No. 16/676,544. (19 pages).

Office Action, issued Feb. 18, 2022 (Feb. 18, 2022), in U.S. Appl. No. 16/676,544. (37 pages).

Office Action, issued Jul. 11, 2022 (Jul. 11, 2022), in U.S. Appl. No. 16/676,544. (38 pages).

Office Action, issued Nov. 2, 2022 (Nov. 2, 2022), in U.S. Appl. No. 16/676,544. (19 pages).

* cited by examiner

AUTONOMOUS TRUCK LOADING FOR MINING AND CONSTRUCTION APPLICATIONS

CROSS-REFERENCE TO RELATED APPLICATION(S)

The present application is a continuation of U.S. patent application Ser. No. 16/676,544, filed Nov. 7, 2019 and issued as U.S. Pat. No. 11,656,626, which claims benefit of and priority under 35 U.S.C. § 119(e) to and is a non-provisional of U.S. Provisional Patent Application No. 62/759,963, filed Nov. 12, 2018, each of which is hereby incorporated by reference herein in its entirety.

STATEMENT REGARDING FEDERAL SPONSORSHIP

No part of this invention was a result of any federally sponsored research.

TECHNICAL FIELD

The present invention relates in general to autonomous systems, and, more specifically, to autonomous truck loading for mining and construction applications.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND

A number of autonomous trucks are being developed for the mining and construction industries. Much of the automation on these trucks concentrates on the excavators, and on the autonomous driving of the trucks; however, as of now, not much autonomous function exists for loading the trucks.

Trucks in a mine generally move dirt, ore, and other matter from one location to another. The ore is usually loaded by an excavator or a loader. In manned vehicles, there is a sequence of coordinated maneuvers as part of the loading process. These coordinated maneuvers include tasks that are performed with the truck, and tasks that are performed solely with the attached excavator or loader. Currently, the humans performing the tasks have a relatively small amount of sensors helping them, but there are also many techniques that the loading operator uses intuitively:

The loader may distribute the load differently if the truck has to climb or descend on the route;
The loader may load less amount if the terrain is challenging for the driver;
In cases where the truck has multiple trailers, the loader may load the trailers differently;
The loader may load the truck differently, depending on the truck type;
The loader may load the truck differently depending on the bay in the truck: i.e., hopper vs. u-section body vs. rock reinforced body;
The loader may first place large rocks in specific areas, and smaller rocks in adjacent areas, to "lock in" the larger rocks;
The loader may load the truck differently if the load is wet, or if the load is a slurry;
The loader may load the truck differently if the truck is a side dump, back dump, or bottom dump truck.

On the loader side, the loading procedure is also significantly affected by the machinery being used. For example, an excavator will follow a different procedure than a front-end loader, and a feeder may require significantly different maneuvers.

For each of these alternatives, there are slightly different loading techniques that are used, both by the truck driver and by the loader. All these peculiarities of the problem are learned with experience and (to a certain degree) with some trial and error on the job. In order to automate the process, this knowledge needs to be explicitly encoded as part of the automation process.

The present invention encodes this knowledge into a database of preferred loading conditions and creates a set of automated maneuvers that accomplish the loading actions. The invention assumes that the truck has a drive-by-wire kit and that it is capable of moving under computer control.

This invention provides a set of tools that allows for the automation of the loading process. The invention is relevant to situations where the truck is autonomous and the excavator is not, or when both are automated.

SUMMARY

To minimize the limitations in the prior art, and to minimize other limitations that will be apparent upon reading and understanding the present specification, the present invention describes autonomous truck loading for mining and construction applications.

These and other advantages and features of the present invention are described herein with specificity so as to make the present invention understandable to one of ordinary skill in the art, both with respect to how to practice the present invention and how to make the present invention.

DETAILED DESCRIPTION

Figure 1:
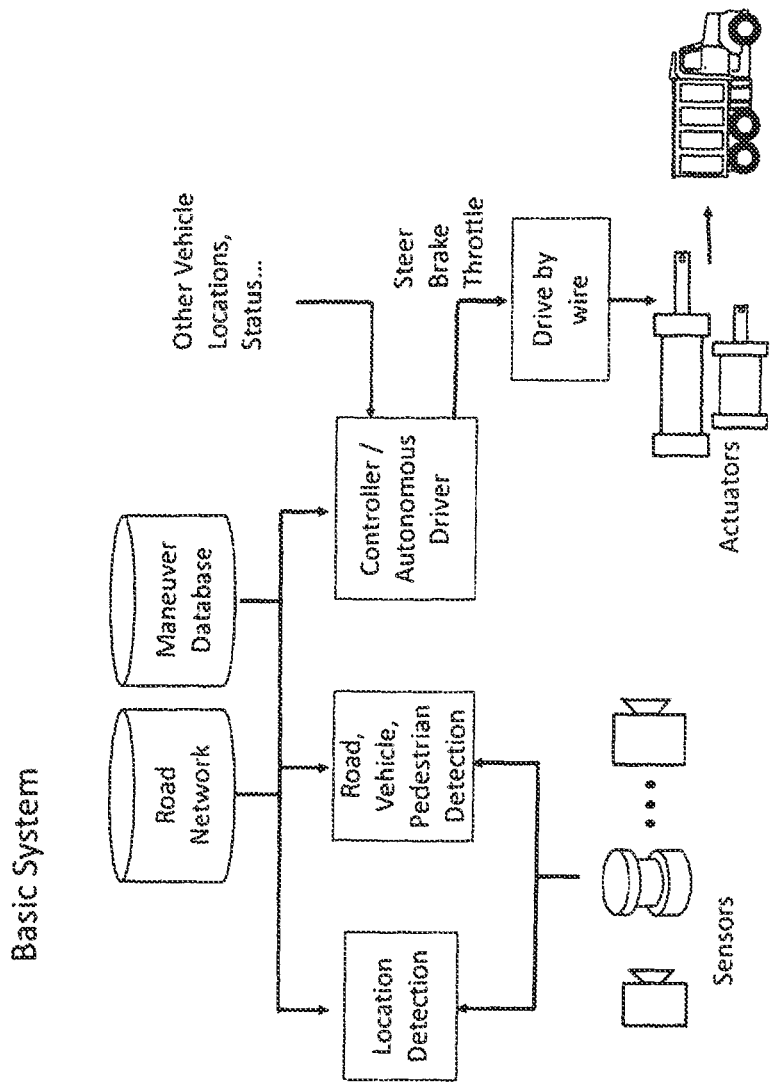
FIG. 1—The use of sensors to detect the location and road, vehicle, pedestrians which are compared to a road network and maneuver database which goes to a controller/autonomous driver which takes into account other vehicle locations and status and is connected to drive by wire which has steer, brake, and throttle, connected with actuators to the truck.

The system is composed of a number of sensors that can be placed both on the loader, on the truck, or in the mining or construction area. By describing the maneuver, we can teach the different automation steps. The process of loading can be divided into three distinct phases: alignment/docking, loading, and departure.

The invention provides a series of tools and behaviors that can be used in each one of these phases. Moreover, the invention has a scripting language that allows for a mining/construction operator to modify and customize the process at each step:

Alignment/Docking Phase. At the beginning of the phase, the truck is likely to be empty, and it must automatically maneuver its hopper or cargo bay into an area that is convenient for the loader to load. Many aspects here are important: the truck must be in a safe pose, the hopper (or at least the area of the bay that the first scoop will be placed) must be within the workspace of the loading system, and usually loaders prefer that the truck be at tangential or normal angles with respect to the loading implement. This alignment simplifies the process of moving the buckets, and minimizes the chances of collisions between the bucket and the truck. The desired alignment and the relative pose between the truck and the loader are inputs to the invention. The invention can automatically generate the trajectories that align/dock the truck to the loading area.

Loading Phase. Depending on the complexity of the operation, the loading may or may not require the truck to move during the process. For example, if the truck has multiple trailers, it will most likely be necessary to load one trailer (or a part of a trailer) and then move the truck to a new position that is within the reach of the workspace of the loader. Once again, the process is significantly different depending on the type of loader used. For example, if the loading is being performed with a bucket loader, the loader may move while the truck remains static throughout the process. However, if the loading is performed with an excavator, it is easier to have the truck move and the excavator to be static. Movement of the truck is coordinated with the movement of the bucket, so that the bucket will not collide with any part of the truck. The invention provides a set of aids and a scripting language that allows a mining or construction operator to design the maneuver. The truck can then perform the maneuver automatically.

Departure Phase. Similar to the alignment phase, the trucks must leave the loading area in a safe manner and without driving over areas that are off limits, or could be dangerous. The invention allows the mining/construction operator to design a maneuver that is suitable for the particular details of the loading area. These maneuvers are instantiated in a scripting language that allows the operator to add/modify/delete these maneuvers.

Depending on the type of mining operation or construction needs, it is not uncommon for the particulars of the loading area to change often. The scripting language has to be sufficiently streamlined where these maneuvers can either be learned, or scripted in a relatively simple way.

Using the invention, the maneuvers in each of the phases above can be driven (or teleoperated) by an operator, and then have the system "replay" that maneuver. The scripting language can use these learned trajectories and concatenate them into new more complex maneuvers.

The scripting language allows the mine operators to assemble and compose new autonomous vehicle behavior. In this particular case, the behavior in focus is the loading of the autonomous truck.

The scripting language in the invention is a graphical user interface, where blocks in the display represent the elementary behavior upon which more complex behavior is built upon.

In particular, the scripting language has behavior blocks, sensing blocks, and logic blocks. Some of the blocks can be learned. For example, the operator may choose to record a trajectory. This trajectory becomes a behavior block. Now, the operator can link two or more of these behaviors to create a more complex behavior. The sensor blocks allow the operator to concatenate behavior until a particular sensor (or combination of sensors) achieve a certain value.

For example, let's say that the mine operator would like to create a new loading behavior. He/she can take a behavior block that encapsulates the motion of the truck to the loading area, then he/she can use the behavior block that positions the middle of the truck perpendicular to the excavator tracks; finally, he/she can use a sensing block and a logic block that forces the truck to stay in that position, until the truck is loaded and the excavator arm is out of the way. Finally, the operator can concatenate another behavior block that has the truck undock and go to the dumping area. The scripting language in the invention is hierarchical, in the sense that more complex behaviors can be encapsulated by using simpler blocks. The preferred embodiment of the invention uses a visual language, as it is simpler to understand by the mining operators; however, other embodiments may have other scripting languages that are not visual, and use text to describe the sequences of actions.

There are three distinct steps on setting up the system:
The mine operator records segments of trajectories that will be used to assemble the loading procedure. These may include positioning the truck at different locations, performing k-turns, and other maneuvers relevant to the three phases of loading presented above.
The mine operator uses these recorded blocks in the scripting language editor to assemble the loading maneuver and to synchronize the operation with the excavator or loader.
The mine operator can use the built-in simulator that simulates the behavior of the script.
The scripts are loaded to the truck, and/or loaded.
The scripts are executed.

While the invention has been described in connection with what is presently considered to be the most practical and preferred embodiments, it is to be understood that the invention is not to be limited to the disclosed embodiments, but, on the contrary, is intended to cover various modifications and equivalent arrangements included within the spirit and scope of the appended claims. Note with respect to the materials of construction, it is not desired nor intended to thereby unnecessarily limit the present invention by reason of such disclosure.

The present invention describes the development of a system creating and executing loading behavior between a truck and a loader that is comprised of a truck with a drive-by-wire kit, a database of stored maneuvers that are relevant to the phases of the loading process and a controller that executes a series of maneuvers that place the truck within the workspace of the loader, and moves the truck as to facilitate the process of loading.

A drive-by-wire kit is a complete hardware and software system that allows seamless electronic control of a vehicle's brake, throttle, steering, and shifting to enable testing for autonomous vehicle applications.

This system that has been developed has some or all of the stored maneuvers created by driving the vehicle manually, created by teleoperating the vehicle, or by using a route planner.

There is a scripting language that allows the mining or construction operator to assemble the maneuver from the different behaviors in this system. There is a simulator that allows the operator to verify the script.

A scripting or script language is a programming language for a special run-time environment that automates the execution of tasks; the tasks could alternatively be executed one-by-one by a human operator. Scripting languages are often interpreted.

In this system, the different behaviors account for variation of the truck being used, or the loader being used.

In this system, the behaviors use sensors in the truck and/or leader to verify that the loading process has been completed.

In this system that has been developed, the truck is equipped with weight measuring sensors that can indicate where the maximum load capacity has been reached.

The maneuvers are different depending on the type of load, or wetness of the load. This system is further enhanced with a sensor or sensor located on the loaders, the truck, or in the mining/construction areas (LADAR, stereo pair, cameras, RF beacons, DGPS, acoustic sensors, or RADAR), which provide the autonomous truck with accurate positioning.

Laser Detection and Ranging (LADAR) illuminates a target with pulsed or modulated laser light and then measures the reflected energy with a sensor. Differences in laser return times and wavelengths are then used to generate accurate target representations via high-res 3D shape and detailed vibration spectrum data that is as unique as a fingerprint. This data is then compared to an existing database of similar items, and the precision results are instantly conveyed back to the user. Generally, this technology is also known as Light Imaging, Detection, and Ranging (LIDAR).

Stereo pair refers to a pair of flat perspective images of the same object obtained from different points of view. When a stereopair is viewed in such a way that each eye sees only one of the images, a three-dimensional (stereoscopic) picture giving a sensation of depth is perceived.

In navigation, a radio frequency (RF) beacon is a kind of beacon, a device which marks a fixed location and allows direction finding equipment to find relative bearing. Radio beacons transmit a radio signal which is picked up by radio direction finding systems on ships, aircraft and vehicles to determine the direction to the beacon.

Differential Global Positioning System (DGPS) is an enhancement to the Global Positioning System (GPS) which provides improved location accuracy, in the range of operations of each system, from the 15-meter nominal GPS accuracy to about 1-3 cm in case of the best implementations.

Rayleigh scattering based distributed acoustic sensing (DAS) systems use fiber optic cables to provide distributed strain sensing. In DAS, the optical fiber cable becomes the sensing element and measurements are made, and in part processed, using an attached optoelectronic device. Such a system allows acoustic frequency strain signals to be detected over large distances and in harsh environments.

Radio Detection and Ranging (RADAR) refers to a detection system that uses radio waves to determine the range, angle, or velocity of objects. It can be used to detect aircraft, ships, spacecraft, guided missiles, motor vehicles, weather formations, and terrain.

In this system that has been developed, the sensors are also used to detect humans, vehicles, and other obstacles, and slows down or stops to avoid collisions. The weight of each trailer in the truck is transmitted to the loader. The weight on each wheel in each of the parts of the truck is transmitted to the trailer.

In this system, the leader and the trucks share localization information that is used as part of the scripting language.

In this system that has been developed, multiple loaders are used to speed up the process of loading the autonomous trucks.

FIG. 1 shows a schematic of the overall basic system for the autonomous trucks for mining and construction applications. Here, the sensors detect the location, road, vehicle, and pedestrians and compares the information to those in the database of the road network and the maneuver database and this information is passed along to the controller/autonomous driver. Information about other vehicles, locations, status, and other information is also passed along to the controller/autonomous driver. The controller/autonomous driver is equipped with drive-by-wire which has steer, brake, and throttle which goes to the actuators and leads to the autonomous truck that is used for the construction and mining applications.

Figure 2:
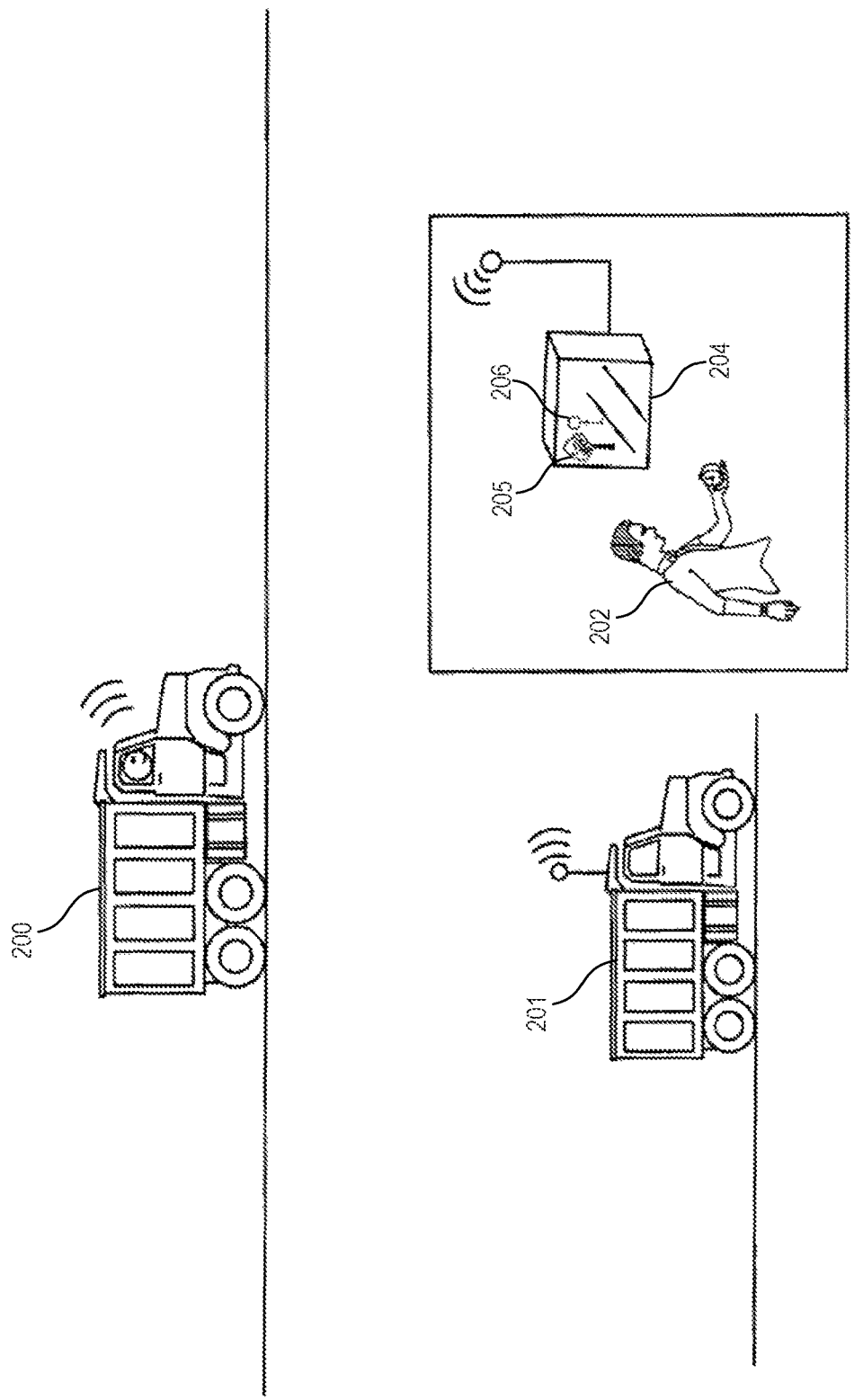
FIG. 2—Paths and locations can be specified by manually driving the vehicle, by remote driving, or by a route planner.

In FIG. 2, it can be seen that the paths and locations can be specified by manually driving the vehicle, by remote driving, or by a route planner. In the top of FIG. 2, it can be seen that the vehicle (200) is manually driven, and in the bottom of the figure, it can be seen that the vehicle (201) is remotely driven by an operator (202). The operator controls the steering wheel on the vehicle (201) on the left based on the view (204) shown containing the tree (205) and the pedestrian (206) standing near the tree (205).

Figure 3:
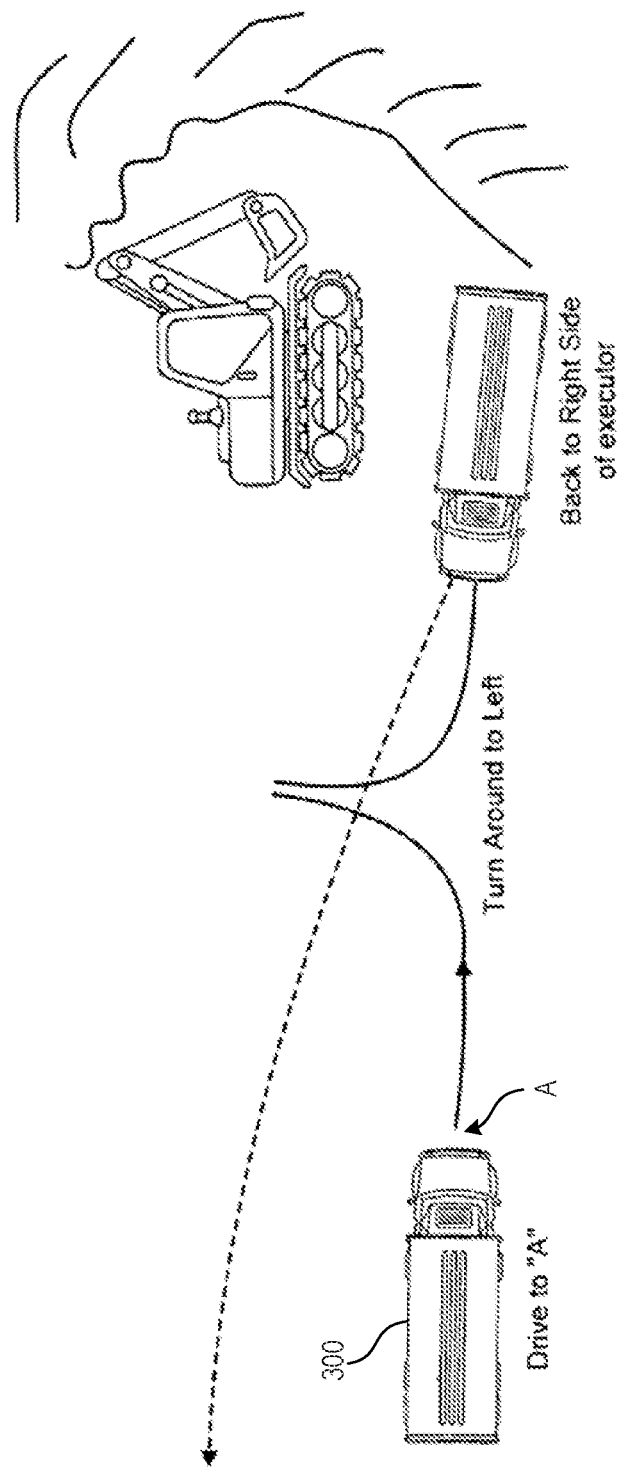
FIG. 3—Shows that as the excavator loads material, the pile will reduce in size. The excavator will have to change position and the "dock" location will change as well.

FIG. 3 shows maneuvers to "dock" location such as the position truck at the right side of the excavator. In the figure, the dashed arrow shows the departure path. As the excavator loads material, the pile will reduce in size. The excavator will have to change position and the "dock" location will change as well. In the figure, the autonomous vehicle (300) on the left drives to point "A" and then turns around to the left side. Then it goes back to the right side of the excavator.

Figure 4:
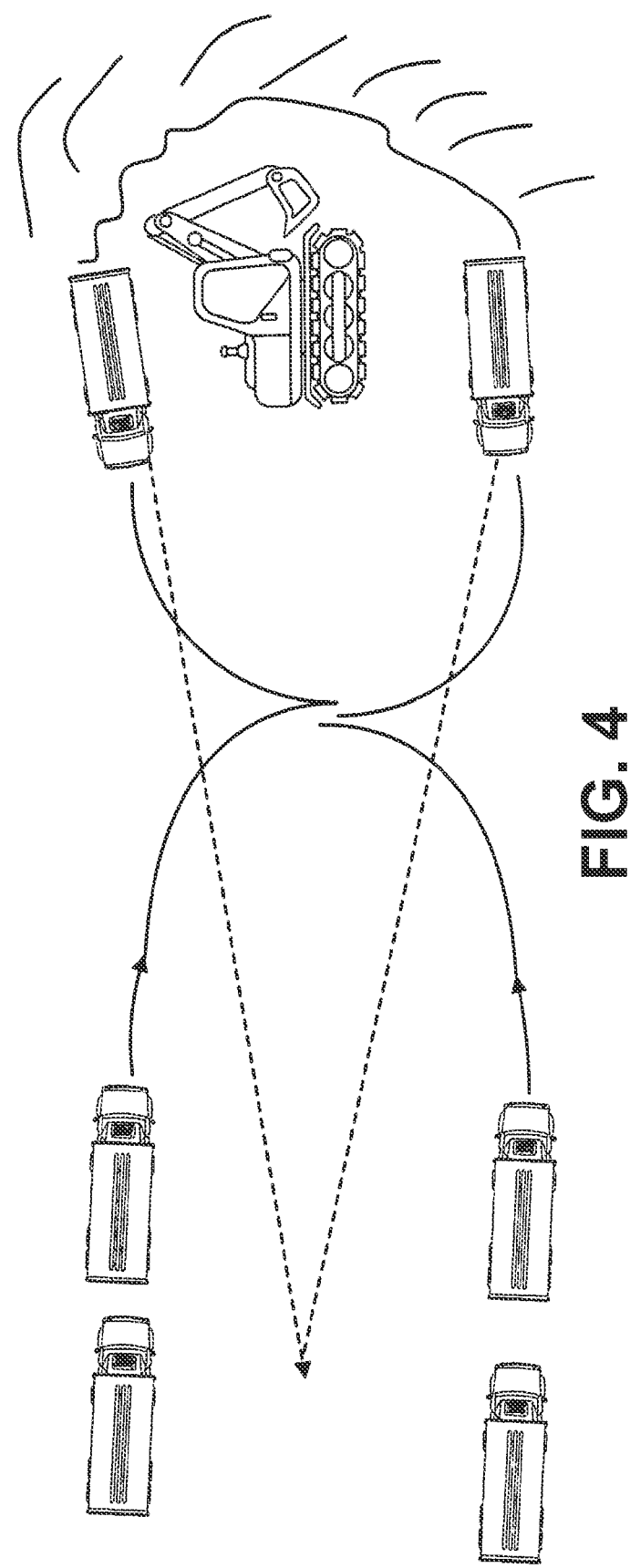
FIG. 4—Multiple trucks can be used with an excavator loading to the left and then to the right.

FIG. 4 shows multiple trucks that can be used with the excavator loading to the left and then to the right. When loading the truck on the left, the full truck on the right leaves and is replaced with an empty truck, keeping the excavator constantly loading. Trucks can wait in different queues for their turn to be loaded or for access to area where they can turn around.

Figure 5:
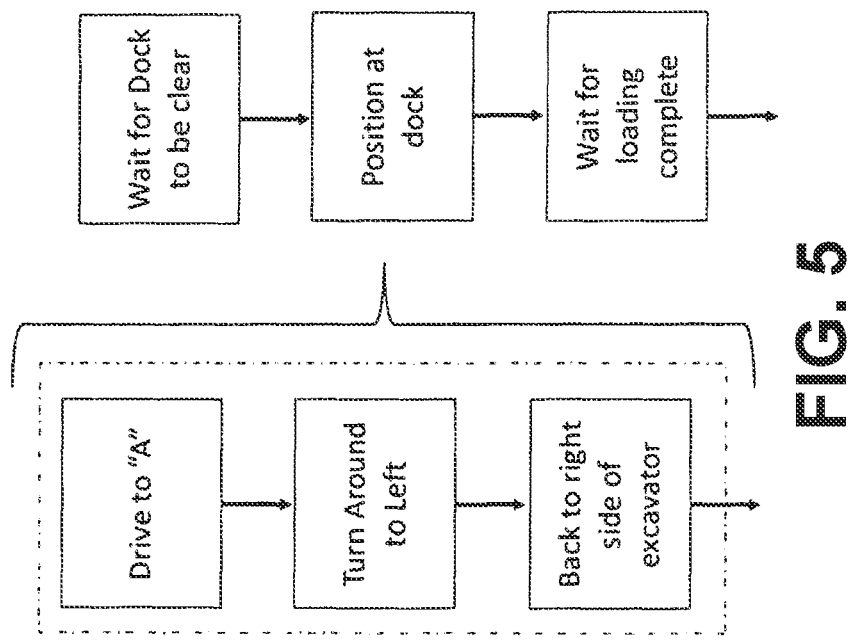
FIG. 5—Scripting language allows various maneuvers to be combined into different behaviors.

FIG. 5 shows that the scripting language allows various maneuvers to be combined into different behaviors. The commands, drive to "A", turn around to left, turn back to right side of excavator is related to waiting for the dock to be clear, positioning at the dock, and waiting for loading to be complete.

The invention claimed is:
1. A system comprising:
an autonomous truck with a drive-by-wire kit;
one or more sensors configured to detect features in an environment surrounding the autonomous truck and/or one or more loaders;
a database storing a plurality of elementary behaviors for various phases of a process of loading the autonomous truck by the one or more loaders, the stored elementary behaviors comprising (i) a plurality of predetermined maneuvers for the autonomous truck, (ii) a plurality of sensing behaviors, and (iii) a plurality of logic behaviors; and a controller operatively coupled to the drive-by-wire kit, the database, and the one or more sensors, wherein the controller is operable to execute stored instructions to:

receive, via a user interface, a selection by an operator of a first one of the stored elementary behaviors from the database, the first selected elementary behavior comprising a sensing behavior that causes the controller to determine a status of loading of the autonomous truck based on signals from the one or more sensors;

receive, via the user interface, a selection by the operator of a second one of the stored elementary behaviors from the database, the second selected elementary behavior comprising a logic behavior that causes the controller to maintain a state of the autonomous truck until the controller determines that loading of the autonomous truck is complete;

receive, via the user interface, a selection by the operator of a third one of the stored elementary behaviors from the database;

receive, via the user interface, a selection by the operator of a fourth one of the stored elementary behaviors from the database;

assemble together the first, second, third, and fourth selected elementary behaviors to form an operation script for loading of the autonomous truck by the one or more loaders; and control, via the drive-by-wire kit, the autonomous truck to perform the operation script for loading.

2. The system of claim 1, wherein:
the third selected elementary behavior comprises a predetermined maneuver that defines a trajectory for the autonomous truck to follow to a loading location of the one or more loaders; and
the fourth selected elementary behavior comprises another predetermined maneuver that defines another trajectory for the autonomous truck to follow away from the loading location.

3. The system of claim 2, wherein at least one of the predetermined maneuvers comprises a trajectory recorded during previous manual operation of the autonomous truck.

4. The system of claim 1, wherein:
the autonomous truck comprises one or more weight measuring sensors; and
the controller is further operable to execute stored instructions to:
determine a weight loaded onto the autonomous truck by the one or more loaders based on signals from the one or more weight measuring sensors;
compare the determined weight to a maximum load capacity of the autonomous truck; and
send, in response to the comparison indicating that the maximum load capacity has been reached, a signal to the one or more loaders to stop loading of the autonomous truck.

5. The system of claim 1, wherein the stored elementary behaviors are classified in the database based on type of load or wetness of the load.

6. The system of claim 1, wherein at least one of the one or more sensors is mounted on the autonomous truck.

7. The system of claim 1, wherein the one or more sensors comprises a laser detection and ranging (LADAR) system, stereo pair, cameras, radio frequency (RF) beacons, a differential global positioning system (DGPS), acoustic sensor, radio detection and ranging (RADAR), or any combination of the foregoing.

8. The system of claim 1, wherein the controller is further operable to execute stored instructions to, during the control of the autonomous truck to perform the operation script:
receive, from the one or more sensors, a signal indicating detection of an obstacle;
determine, in response to the received signal, one or more variations to the operation script that avoids a collision with the detected obstacle, the one or more variations comprising a trajectory deviation, a velocity change, or a stoppage of the autonomous truck; and
control, via the drive-by-wire kit, the autonomous truck to perform the operation script with the one or more variations.

9. The system of claim 1, wherein:
the autonomous truck comprises one or more weight measuring sensors; and
the controller is further operable to execute stored instructions to:
determine, based on signals from the one or more weight measuring sensors, a current weight loaded onto the autonomous truck by the one or more loaders; and
send a signal to the one or more loaders indicating the current weight loaded onto the autonomous truck.

10. The system of claim 1, wherein:
the autonomous truck comprises a weight measuring sensor for each wheel; and
the controller is further operable to execute stored instructions to:
determine, based on one or more signals from each weight measuring sensor, a current distribution of weight loaded onto the autonomous truck by the one or more loaders; and
send a signal to the one or more loaders indicating the current distribution of weight loaded onto the autonomous truck.

11. The system of claim 1, wherein at least one of the one or more sensors is mounted on the one or more loaders or disposed in the environment surrounding the autonomous truck and/or the one or more loaders.

12. The system of claim 1, wherein:
the third selected elementary behavior comprises a sensing behavior that causes the controller to determine a status of a loading area based on signals from the one or more sensors; and
the fourth selected elementary behavior comprises a logic behavior that causes the controller to maintain a location of the autonomous truck outside of the loading area until the loading area is clear.

13. The system of claim 1, wherein:
the third selected elementary behavior comprises a sensing behavior that causes the controller to detect movement of a loading mechanism of one of the one or more loaders based on signals from the one or more sensors; and
the fourth selected elementary behavior comprises a maneuver that causes the controller to coordinate movement of the autonomous truck with the detected movement of the loading mechanism.

14. A method comprising:
receiving, via a user interface, a selection by an operator of a first one of a plurality of elementary behaviors for various phases of a process of loading of an autonomous truck by one or more loaders, the plurality of elementary behaviors comprising (i) a plurality of predetermined maneuvers for the autonomous truck, (ii) a plurality of sensing behaviors, and (iii) a plurality of logic behaviors;

receiving, via the user interface, a selection by the operator of a second one of the elementary behaviors;

forming, via a controller, an operation script for loading of the autonomous truck by the one or more loaders, the forming comprising assembling together at least the first selected elementary behavior and the second selected elementary behavior; and controlling, via the controller, a drive-by-wire kit of the autonomous truck to perform the operation script for loading, wherein the first selected elementary behavior comprises a sensing behavior that causes determination of a status or detection of movement based on signals from one or more sensors configured to detect features in an environment surrounding the autonomous truck and/or one or more loaders.

15. The method of claim 14, wherein:

the sensing behavior of the first selected elementary behavior causes determination of the status of loading of the autonomous truck based on signals from the one or more sensors; and the second selected elementary behavior comprises a logic behavior that causes maintenance of a state of the autonomous truck until the controller determines that loading of the autonomous truck is complete.

16. The method of claim 15, further comprising:

receiving, via the user interface, a selection by the operator of a third one of the elementary behaviors; and receiving, via the user interface, a selection by the operator of a fourth one of the elementary behaviors, wherein the forming the operation script comprises assembling together the first, second, third, and fourth selected elementary behaviors.

17. The method of claim 16, wherein:

(a) the third selected elementary behavior comprises a sensing behavior that causes the controller to determine a status of a loading area based on signals from the one or more sensors, and the fourth selected elementary behavior comprises a logic behavior that causes the controller to maintain a location of the autonomous truck outside of the loading area until the loading area is clear; or (b) the third selected elementary behavior comprises a sensing behavior that causes the controller to detect movement of a loading mechanism of a one of the one or more loaders based on signals from the one or more sensors, and the fourth selected elementary behavior comprises a maneuver that causes the controller to coordinate movement of the autonomous truck with the detected movement of the loading mechanism.

18. Non-transitory computer-readable media storing computer-readable instructions that, when executed by one or more processors, cause:

receiving a selection by an operator of a first one of a plurality of elementary behaviors for various phases of a process of loading of an autonomous truck by one or more loaders, the plurality of elementary behaviors comprising (i) a plurality of predetermined maneuvers for the autonomous truck, (ii) a plurality of sensing behaviors, and (iii) a plurality of logic behaviors;

receiving a selection by the operator of a second one of the elementary behaviors;

assembling together at least the first selected elementary behavior and the second selected elementary behavior to form an operation script for loading of the autonomous truck by the one or more loaders; and controlling a drive-by-wire kit of the autonomous truck to perform the operation script for loading, wherein the first selected elementary behavior comprises a sensing behavior that causes determination of a status or detection of movement based on signals from one or more sensors configured to detect features in an environment surrounding the autonomous truck and/or one or more loaders.

19. The non-transitory computer-readable media of claim 18, wherein:

the sensing behavior of the first selected elementary behavior causes determination of the status of loading of the autonomous truck based on signals from the one or more sensors; and the second selected elementary behavior comprises a logic behavior that causes maintenance of a state of the autonomous truck until loading of the autonomous truck is complete.

20. The non-transitory computer-readable media of claim 19, storing further instructions that, when executed by the one or more processors, further cause:

receiving a selection by the operator of a third one of the elementary behaviors; and receiving a selection by the operator of a fourth one of the elementary behaviors, wherein the assembling includes assembling together the first, second, third, and fourth selected elementary behaviors to form the operation script.

* * * * *